INVENTOR
BUDD W. ANDRUS
ATTORNEY

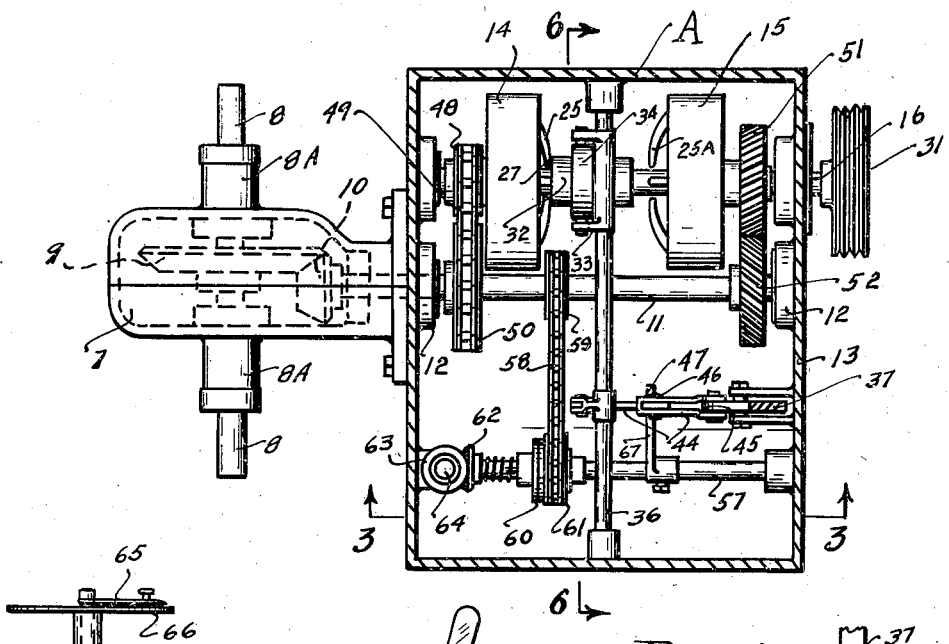

Oct. 16, 1945.   B. W. ANDRUS   2,386,923
POWER TRANSMISSION FOR SAWMILL CARRIAGES
Filed Dec. 28, 1942   3 Sheets-Sheet 3

Inventor
Budd W. Andrus
By
Attorney

Patented Oct. 16, 1945

2,386,923

UNITED STATES PATENT OFFICE 2,386,923

POWER TRANSMISSION FOR SAWMILL CARRIAGES

Budd W. Andrus, Eugene, Oreg.

Application December 28, 1942, Serial No. 470,375

10 Claims. (Cl. 192—51)

This invention relates to power transmissions and is particularly adapted for the transmitting of power from a power source located on a log carriage to the drive for operating the knees of the carriage.

The primary object of the invention is to provide a transmission for driving the power shaft of the carriage in a direction to force the knees against the log, feeding it into the head rig of the mill.

A further object of the invention is to provide means within the transmission for automatically stopping its forward drive, thereby bringing the knees of the carriage to rest.

Another object of the invention is to provide a reversing means within the transmission operating from the same control lever as that of the forward drive.

A still further object of the invention is to provide means for determining the amount that the transmission will drive the knees forward, setting this timing apparatus manually, said apparatus will automatically throw the clutch mechanism out of engagement within the transmission when the log has been forced a predetermined amount towards the head rig.

These and other incident objects will be apparent in the drawings, specification and claims.

Referring to the drawings:

Figure 2 is a plan view, in section, of my new and improved power transmission unit.

Figure 3 is an end sectional view, taken on line 3—3 of Figure 2.

Figure 4 is a fragmentary sectional view, illustrating part of the automatic control unit.

In the drawings:

Figure 1:
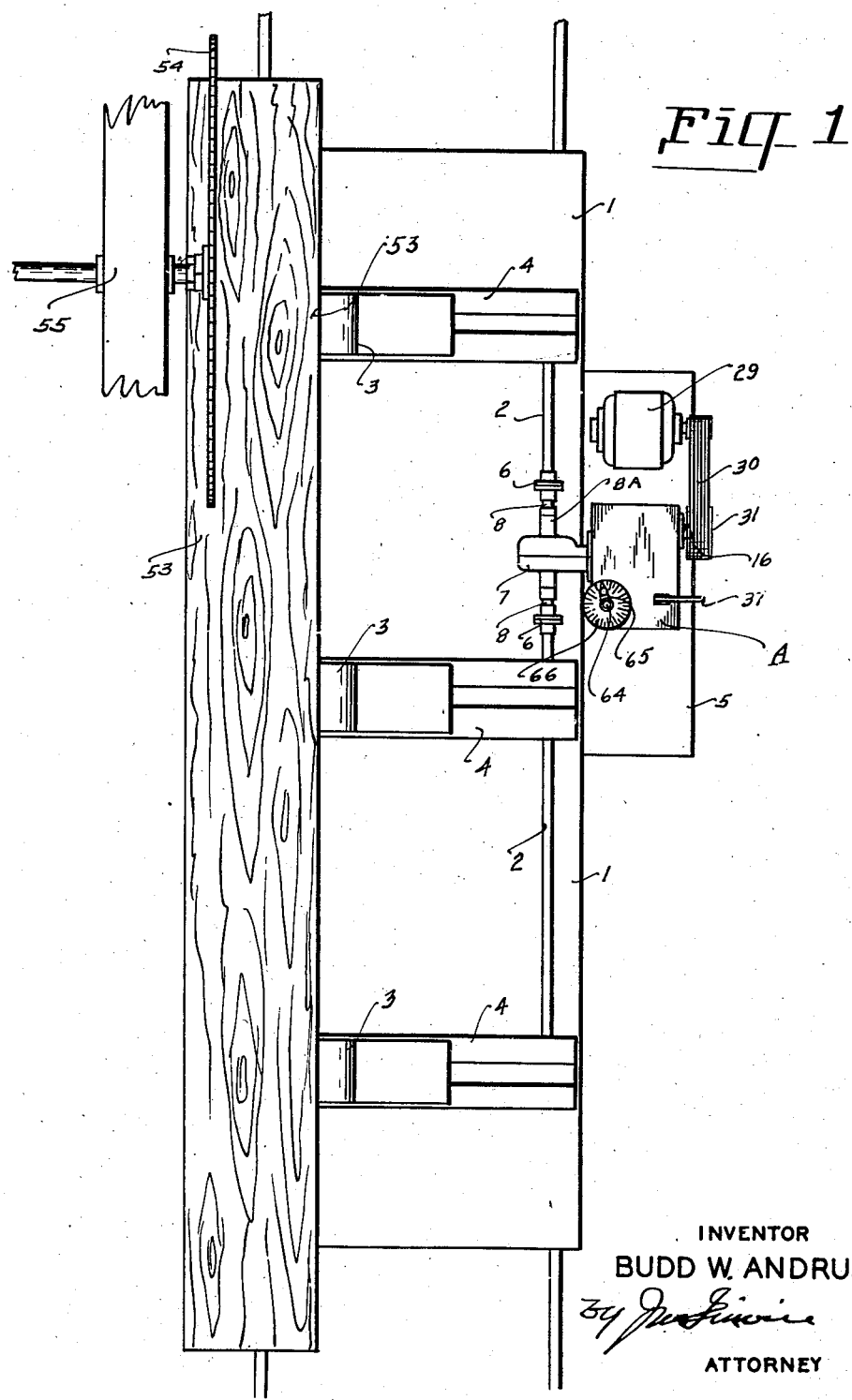
Figure 1 is a plan view of my power transmission mounted upon a conventional log carriage, used in the lumber industry.

My power transmission is mounted to a conventional log carriage 1, and drives the shaft 2 for operating the knees 3 along their guideways 4. The method of operating the knees by the shaft 2 may vary in logging carriages, and has nothing to do with the operation of my invention. My power transmission is mounted on a platform 5 and is connected to the cross shaft 2 by suitable couplers 6 in the following manner.

The housing 7 has a transverse shaft 8 and ring gear 9 journaled in suitable bearings within the outwardly extending hubs 8A. The ring gear is driven by the pinion 10, which is keyed to the shaft 11, said shaft 11 is journaled within suitable bearings 12. The direction of the shaft 8 may be reversed by the rotation of the housing 7 one hundred eighty degrees about the shaft 11. This feature readily adapts my power transmission to any type of log carriage without altering the mechanism within the transmission unit. The shaft 11 is driven from the clutches 14 and 15 when these clutches are engaged with the shaft 16.

Figure 5:
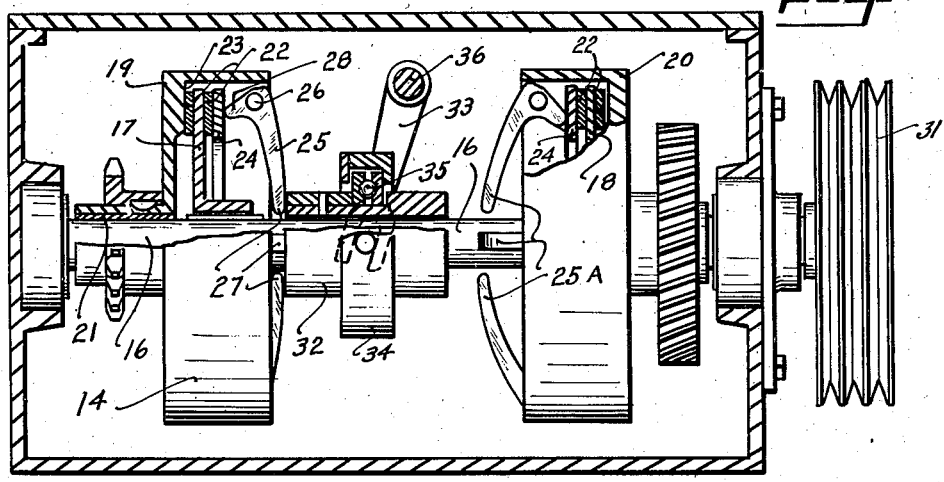
Figure 5 is a sectional view, of Figure 2, illustrating the clutch assembly unit.

Referring to Figure 5, the following is a description of the operation of these clutches. Discs 17 and 18 are slidably mounted and keyed to the shaft 16. The drums 19 and 20 are rotatably mounted on the shaft 16 on suitable bearings 21. The discs 17 and 19 have friction faces 22 secured on both of their sides. One face of the discs engage the surface 23 of the drum and the other engages the floating clutch ring 24. Friction is obtained between these members by the pivotally mounted levers 25, which are journaled at 26 to the drum 19. When the outward ends 27 of these levers are moved towards the drum, the cam arms 28 force the ring 24 against the frictional surface of the disc 17, locking the drum in relation to the disc, the whole assembly will then be rotated by the shaft 16. This construction is of well known practice, and I do not wish to be limited to any particular type of clutch mechanism, as any suitable clutch mechanism will carry out the objects of my invention.

The shaft 16 is driven by a suitable power unit, as for instance the electric motor 29 and belts 30. The belts 30 are trained about the drive pulley 31 which is keyed to the shaft 16. The clutch arms 25 are operated by the slidably mounted sleeve 32, which is operated by the yoke 33, engaging the collar 34, which is mounted to a suitable thrust bearing 35. The clutch yoke 33 is fixedly mounted to the transverse shaft 36, and is operated in the following manner.

A hand operating lever 37 is pivotally mounted within the case at 38, a jack-knife link mechanism 39 is pivotally mounted at 40 to the lower end of the lever at its one end and is pivotally mounted to the opposite end at 41 to the crank 42. The crank 42 is fixedly secured to the cross shaft 36, and is best illustrated in Figures 3 and 4, the position of the jack-knife link 39 is illustrated in neutral position in Figure 4, the lever 37 being held in a vertical position by the spring 43. The crank 42 and the clutch yoke 33 are also positioned in a vertical position by the action of the clutch arms 25 maintaining the sleeve 32 in a midway position.

The jack-knife link is formed of two parts, the link 44 and the link 45 are hinged together at 39'. The link 45 has a cross bar 47 for allowing the assembled link to pass its center line as shown, which will be more fully described later. The clutch 14 has a sprocket 48 keyed thereto. This sprocket drives a sprocket 50, which is keyed to the shaft 11 by the chain 49. The clutch 15 is geared to the shaft 11 by the gears 51 and 52, which are keyed to their respective shafts. These gears reverse the direction of the shaft 11 as to that of the chain 48.

The shaft 16 is driven by the motor 29 continuously. When it is desired to force the log 53 towards the saw 54 of the head rig 55, the shaft 2 of the carriage must be rotated in the proper direction to cause the knees 3 to force the log towards the head rig. In order to do this, referring to Figure 4, the lever 37 is pulled in the direction of the arrow, which will straighten out the link mechanism 39 so that it will pass down beyond its center 36. The lever is then forced in the opposite direction of the arrow, or to the position shown in Figure 3. This will force the crank arm 42 in the direction of the arrow and the yoke 33 to the position shown in Figure 5, forcing the sleeve 32 against the arms 25, locking the clutch mechanism to the shaft 16, which will rotate the counter shaft 11, driving the pinion 10, ring gear 9 and the shaft 8 together with the shaft 2 of the carriage. The operator holds the lever in this position until it is desired to stop the travel of the knees when he will return the lever to neutral position.

I have provided an automatic release for the clutch mechanism, which I will now describe. A shaft 57 is mounted within the transmission case and is rotated by the chain 58 from the sprocket 59, which is keyed to the shaft 11. A slipping clutch mechanism 60 is mounted to the shaft 57, and as the chain 58 rotates the sprocket 61 any back pressure over a certain amount applied to the shaft 57 will cause the clutch 60 to slip, allowing the shaft to stand still. The shaft 57 may be manually rotated by the pinion wheel 62, keyed thereto and driven by the pinion 63, which is keyed to the shaft 64. The shaft 64 is rotated by the lever 65 which rotates above a graduated dial plate 66. The position of the lever is determined by the operator of the carriage.

Figure 6:
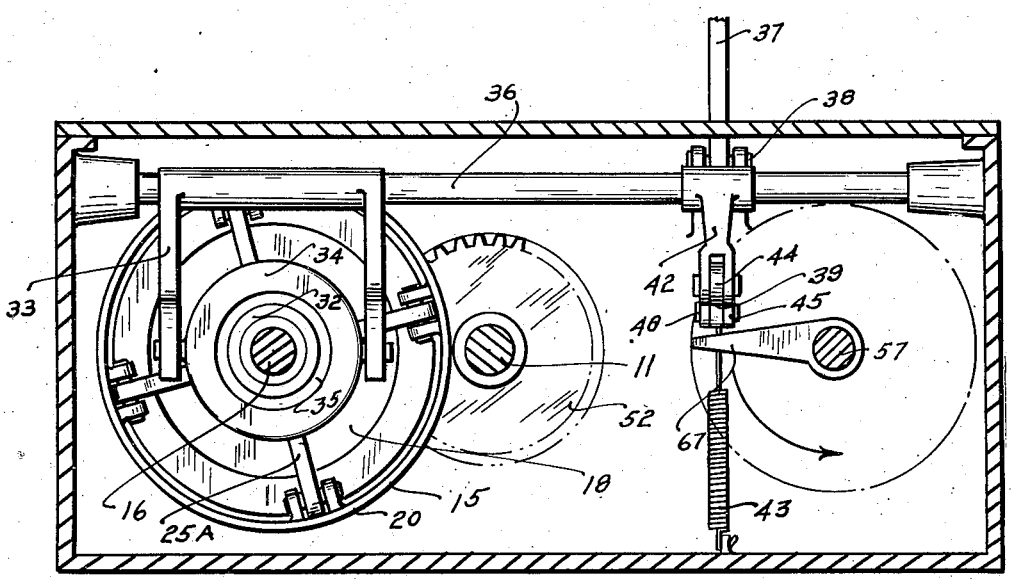
Figure 6 is a sectional view, taken on line 6—6 of Figure 2, illustrating the clutch assembly and part of the automatic throw out mechanism.

Keyed to the shaft 57 is an arm 67, which when rotated towards the underside of the link mechanism 39 will buckle the link assembly and allow the crank 42 to permit the clutch yoke 33 to center the sleeve 32, disengaging the clutch 19, thereby stopping the rotation of the shaft 11 and the shaft 2 of the carriage 1. The amount that the lever 65 is rotated in a direction to revolve the shaft 57 and crank arm 67 in the direction of the arrow, Figure 6, will determine the length of time that it will take the arm 67 to reach the link assembly 39 for disengaging the same and stopping the forward travel of the knees of the carriage.

I will now describe a complete cycle of operation. The number of revolutions of the shaft 2 of the carriage determines the amount the log 53 will be forced towards the head rig and the thickness of cant to be cut therefrom. This is an established principle used in present day log carriages. Heretofore, it has been the custom for the carriage operator to watch a pointer arrive at a certain point on a dial located on the carriage, then manually disengage the drive mechanism from the shaft 2. This has not always been an accurate gauge, but with my new and improved power transmission, the operator first revolves the pointer arm 65 over the dial 66 to the thickness of cant he wishes to remove from the log. This will bring the lever arm 67 a predetermined distance, in the direction of the arrow Figure 6, away from the link assembly, after starting the transmission it will take a predetermined number of revolutions of the counter shaft 11 driving the chain 58 to return the lever 67 to contact with the jack-knife link assembly 39, best shown in Figures 3 and 6. The lever 37 is then held by the operator in the position shown in Figure 3, holding the clutch 14 in locked engagement driving the counter shaft 11 and the shaft 2 of the carriage. When the lever arm 67 reaches and engages the link assembly 39, it will buckle the assembly 39, permitting the arm 42 of the clutch yoke assembly to take the position shown in Figure 4, even though the lever is being held by the operator of the machine.

With this system of controlling the number of revolutions applied to the shaft 2, cants of accurate thicknesses can be removed from the log. It is a comparatively simple matter for the operator to adjust the pointer hand 65 to the desired graduated point on the dial, then holding the operating lever in position for locking the clutch, the machine itself disengaging the clutch after a predetermined number of revolutions has been made.

In order to retract the knees 3 of the log carriage, the shaft 2 must be reversed, which is accomplished in the following manner. The lever 37 is pulled in the direction of the arrow, causing the link assembly 39 to pull the lever arm 42 in the opposite direction of the arrow, rotating the clutch yoke 33 forcing the sleeve 32 into engagement with the arms 25A of the clutch 15, locking this assembly as heretofore described, driving the gear 51, which in turn rotates the gear 52 and the counter shaft 11 in the reverse direction. When the lever is released this rotation will cease and the knees will come to rest. It is not necessary to have an automatic throw out arrangement for returning the knees to a starting position.

I do not wish to be limited to the exact mechanical form, as described and illustrated, as other mechanical equivalents may be employed still coming within the scope of my claims.

Having thus described the invention, what is claimed as new, is:

1. A power transmission unit, including a driving shaft, clutch elements for operating the shaft in either direction, manually-operable means including a toggle link for selecting a clutch element for operating the shaft, and means selectively set and automatically operated by the driving shaft for breaking the toggle link to release the operated clutch following a predetermined operation of the driving shaft thereby.

2. A power transmission unit, including a driving shaft, a direct-driving clutch therefor, a reverse driving clutch therefor, means for manually setting either clutch, said means including a manually-operated lever and a toggle link, and means automatically operated by the driving shaft tripping the toggle link to release the selected clutch following a predetermined operation of the shaft.

3. A power transmission unit, including a driving shaft, a direct-driving clutch therefor, a reverse-driving clutch therefor, a lever for selecting either clutch for operation, a toggle link operated by the lever in setting the selected clutch, an arm to be operated in the movement of the driving shaft to engage and trip the toggle lever link to release the selected clutch, and means for selectively positioning the arm with relation to the toggle link to determine the degree of operative movement of the driving shaft prior to the automatic release of the clutch.

4. A construction as defined in claim 3, wherein the toggle link is normally broken and wherein the operation of the lever will first straighten the link and then exert pressure on the link to operate the selected clutch, and wherein the arm will break the link regardless of the position of the lever.

5. A construction as defined in claim 3, wherein a sleeve is slidably mounted on the driving shaft, and wherein the clutches each include cam means to be operated by the sleeve for setting the clutches, and wherein means are provided for transmitting operation of the link to the sleeve.

6. A construction as defined in claim 3, wherein a shaft is provided for carrying the arm, and wherein the shaft is driven by the driving shaft through a slip clutch, and wherein manually-operable means are provided for turning the shaft to set the arm at selected distances from the toggle link.

7. A power transmission unit, including a driving shaft, clutch elements for operating the shaft in either direction, manually operable means for selecting a clutch element to operate the shaft, automatically operating means for releasing the selected clutch without regard to the position of the manually operable means, and a timing mechanism to control the automatically operating means to select the automatic clutch release at any desired period of shaft revolution.

8. A power transmission unit including a driving shaft, means whereby the shaft may be driven in either direction including independent clutches and means for selectively operating said clutches at will, said operating means including a clutch operator, a manual element and means between the clutch operator and the element to be set for operation and then operated in one continuous movement of the manual element to operate a selected clutch, and means to automatically break the set of said member to interrupt the effect of the manual element on said clutch operator and return the clutch operator to neutral position with respect to the clutches regardless of the operative position of the manual element.

9. A power transmission unit including a driving shaft, means whereby the shaft may be driven in either direction including independent clutches and means for selectively operating said clutches at will, said operating means including a clutch operator, a manual element and means between the clutch operator and the element to be set for operation and then operated in one continuous movement of the manual element to operate a selected clutch, said member including a toggle section to be set in the initial operation of the manual element and an arm operated by the driving shaft to automatically break the toggle section to move the clutch operator to normal position relative to the clutches without necessitating movement of the manual element.

10. A power transmission unit including a driving shaft, means whereby the shaft may be driven in either direction including independent clutches and means for selectively operating said clutches at will, said operating means including a clutch operator, a manual element and means between the clutch operator and the element to be set for operation and then operated in one continuous movement of the manual element to operate a selected clutch, said member including a toggle section to be set in the initial operation of the manual element and an arm operated by the driving shaft to automatically break the toggle section to move the clutch operator to normal position relative to the clutches without necessitating movement of the manual element and means whereby the operation of the arm may be selectively controlled for any desired clutch operation of the driving shaft.

BUDD W. ANDRUS.